United States Patent
Xie et al.

(10) Patent No.: US 7,721,016 B2
(45) Date of Patent: May 18, 2010

(54) METHOD FOR USING HOST CONTROLLER TO SOLICIT A COMMAND FAILURE FROM TARGET DEVICE IN ORDER TO INITIATE RE-ENUMERATION OF THE TARGET DEVICE

(75) Inventors: Wen Xiang Xie, Singapore (SG); Sze Chek Tan, Singapore (SG); Yew Meng Tan, Singapore (SG); Zhong Quan Jiang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 80 days.

(21) Appl. No.: 11/705,065

(22) Filed: Feb. 12, 2007

(65) Prior Publication Data
US 2008/0195765 A1 Aug. 14, 2008

(51) Int. Cl.
*G06F 3/00* (2006.01)

(52) U.S. Cl. .................... 710/15; 710/8; 710/9; 710/10; 710/16; 710/17; 710/18; 710/19; 710/35; 710/36; 710/62; 710/72; 710/105; 710/303; 710/305; 710/313; 703/20; 703/24; 703/25

(58) Field of Classification Search ............. 710/15–19, 710/62, 313, 35, 72, 303, 105, 305, 8–10, 710/36; 703/20, 24, 25
See application file for complete search history.

(56) References Cited

U.S. PATENT DOCUMENTS

| | | | |
|---|---|---|---|
| 6,636,929 B1 * | 10/2003 | Frantz et al. ................ | 710/313 |
| 6,791,950 B2 * | 9/2004 | Wu ............................. | 370/257 |
| 6,954,808 B2 * | 10/2005 | Russell ........................ | 710/62 |
| 7,082,598 B1 * | 7/2006 | Le et al. ...................... | 717/127 |
| 7,149,835 B2 * | 12/2006 | Engler ......................... | 710/300 |
| 7,269,183 B2 * | 9/2007 | Morris ........................ | 370/466 |
| 7,369,982 B2 * | 5/2008 | Leaming ...................... | 703/25 |
| 7,376,546 B2 * | 5/2008 | Dominguez et al. .......... | 703/20 |
| 7,433,991 B2 * | 10/2008 | Fujita et al. ................. | 710/316 |
| 7,451,257 B2 * | 11/2008 | Kim et al. .................... | 710/105 |
| 7,464,016 B2 * | 12/2008 | Freyensee et al. ............. | 703/20 |
| 2001/0027500 A1 | 10/2001 | Matsunaga | |
| 2003/0177294 A1 * | 9/2003 | Russell ........................ | 710/62 |
| 2005/0240695 A1 | 10/2005 | Leaming | |
| 2005/0273312 A1 * | 12/2005 | Sandulescu et al. ........... | 703/25 |
| 2006/0053244 A1 | 3/2006 | Fruhauf et al. | |
| 2006/0095644 A1 * | 5/2006 | Fujita et al. ................. | 710/313 |
| 2007/0299650 A1 * | 12/2007 | Tamayo et al. ................ | 703/27 |

FOREIGN PATENT DOCUMENTS

EP 1 139 226 A1 10/2001

* cited by examiner

*Primary Examiner*—Tammara Peyton
(74) *Attorney, Agent, or Firm*—Fellers, Snider, et al.

(57) ABSTRACT

A method of initiating re-enumeration of a USB device without manual intervention is provided. The method involves a sequence emulating detachment and re-attachment of a device to the host while the device remains attached to the host. As the device remains attached to the host throughout the sequence, the host OS is manipulated to receive a plurality of preset device states in order for it to perceive a device change and to eventually initiate device enumeration. The sequence, which involves a series of command exchanges between the device and the host, may be initiated by a software application residing in the host upon an event requiring device enumeration.

20 Claims, 2 Drawing Sheets

US 7,721,016 B2

METHOD FOR USING HOST CONTROLLER TO SOLICIT A COMMAND FAILURE FROM TARGET DEVICE IN ORDER TO INITIATE RE-ENUMERATION OF THE TARGET DEVICE

FIELD OF INVENTION

The present invention relates generally to Universal Serial Bus (USB) devices, and more particularly to a method of initiating device re-enumeration without physical detachment and reattachment of a USB device in relation to a host.

BACKGROUND OF THE INVENTION

Removable Universal Serial Bus (USB) data storage devices have gained popularity due to their large capacities and shrinking physical sizes which allow the devices to be portable. Multiple partitions may be provided of which one or more partitions may be secured to allow authenticated access to data stored in the secured partitions, while other partitions remain unsecured to allow unrestricted access to data stored therein.

At times, users of storage devices may need to modify their storage requirements. For example, users may need to modify a partition into two partitions. Each time a storage device is repartitioned, a host to which the device is connected to, e.g., a personal computer, is required to re-enumerate the device. Enumeration is automatic if the device is cold-plugged to the host. However, if the device is repartitioned while remaining connected to the host, the host is unable to automatically enumerate the device upon completion of repartitioning. Manual intervention, e.g., physically detaching the device from the host and re-attaching it, is required to initiate re-enumeration of the device.

SUMMARY OF THE INVENTION

Embodiments of the invention allow a host to initiate re-enumeration of a USB device following an event requiring device re-enumeration without the need for manual intervention, i.e., physically detaching and re-attaching the device to the host. Also, no additional hardware support is needed.

To this purpose, a sequence or procedure emulating detachment and attachment of a USB device to a host is performed while the device remains attached or connected to the host throughout the sequence. The sequence involves a series of command exchanges between the device and the host to enable an operating system (OS) residing in the host perceive a device change which in turn causes the host OS to initiate enumeration of the device. Since the device remains attached to the host throughout the sequence, the host OS is manipulated to receive a plurality of preset device states in order for it to perceive a device change.

Other features and benefits that characterize embodiments of the present invention will be apparent upon reading the following detailed description and review of the associated drawings.

DETAILED DESCRIPTION

In the following description, numerous specific details are set forth in order to provide a thorough understanding of various embodiments of the present invention. It will be understood, however, to one skilled in the art, that embodiments of the present invention may be practiced without some or all of these specific details. In other instances, well known process operations have not been described in detail in order not to unnecessarily obscure pertinent aspects of embodiments being described.

Figure 1:
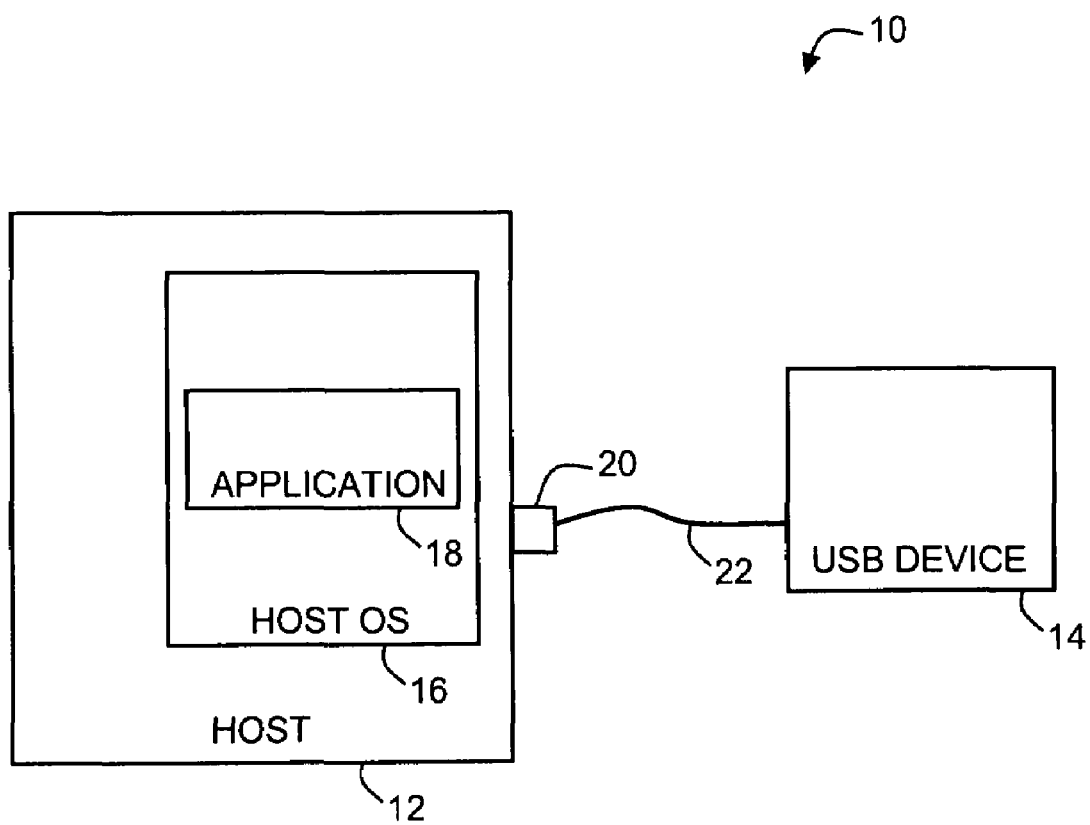
FIG. 1 illustrates a system comprising a host and a USB device.

FIG. 1 illustrates a system 10 comprising a host 12, such as a personal computer or any computing device, which is coupled to a Universal Serial Bus (USB) device 14. The host 12 includes an operating system (OS) 16 and a software application 18 stored in a non-volatile memory of the host 12. A Microsoft® Windows® product may be used as the OS in embodiments of the invention. However, it should be appreciated that other operating systems may alternatively be used. The software application 18 is configured to interact with the host OS 16 and with the device 14, such as to repartition the device 14. An attachment point (port) 20 is provided at the host 12 to receive a cable 22 from the device 14 to electrically couple the device 14 to the host 12. Alternatively, a hub (not shown) may be provided between the device 14 and the port 20 to electrically couple the device 14 to the host 12. The hub provides additional attachment points through which other USB devices may be simultaneously coupled to the host 12.

To initiate re-enumeration of a USB device 14 without manual intervention, a sequence emulating detachment and re-attachment of a device 14 in relation to a host 12 is performed while the device 14 remains connected to the host 12. The sequence may be invoked by a predetermined event which requires device re-enumeration. The sequence involves a plurality of command exchanges between the device 14 and the host OS 16 and/or an application 18 residing in the host 12 to manipulate the host OS 16 perceive a device change even though the device 14 remains connected to the host 12 throughout the sequence. In particular, the host OS 16 is manipulated to perceive a first state in which the device 14 appears disconnected from the host 12 and subsequently to perceive a second state in which the device 14 appears connected to the host 12. This sequence emulating a device change causes the host OS 16 to initiate device enumeration in accordance with standard OS behavior.

Figure 2:
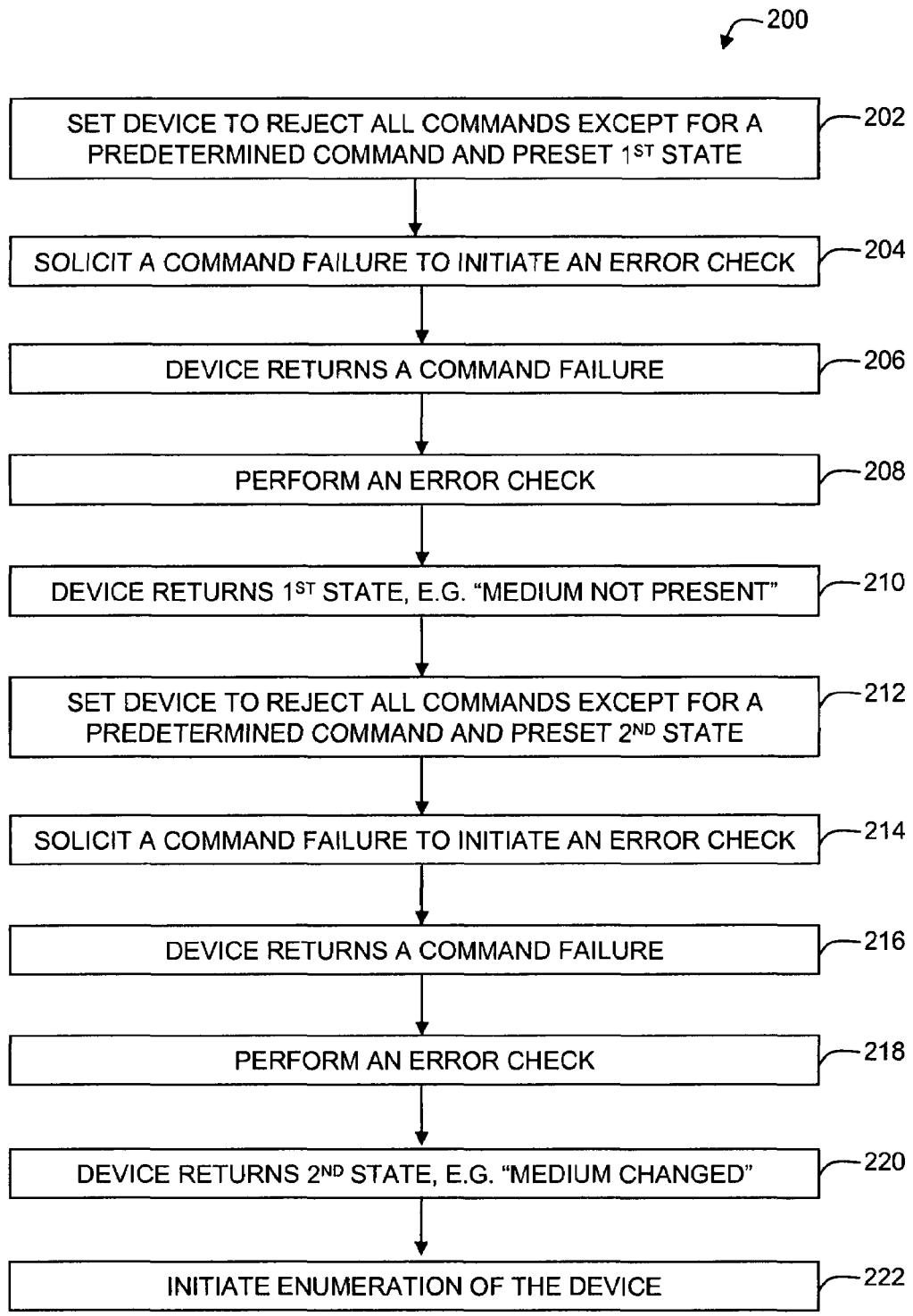
FIG. 2 illustrates a flow sequence according to one embodiment of the invention.

Reference is now made to FIG. 2 which illustrates a sequence 200 for initiating enumeration of a USB device 14 according to one embodiment of the invention. The sequence 200 may be invoked by a predetermined event which requires device enumeration. Examples of such an event include, but not limited to, repartitioning of the USB device (such as from one partition to two partitions, and any other combinations of repartitioning) and modifying the security level of a partition in the device 14 (e.g. protecting or securing a partition, or vice versa). The following description applies to removable storage devices utilizing USB mass storage class Bulk-Only transport specification based on Small Computer System Interface (SCSI) command sets. However, it should be appreciated that the following description also applies to USB devices utilizing Control Bulk Interrupt (CBI) transport specification.

The sequence 200 may be invoked by a software application 18 residing in the host 12 upon an occurrence of a predetermined event. The application 18 issues a first customized command in block 202 to configure the device 14 reject all commands and requests, except for a predetermined command. In other words, only the predetermined command may be accepted by the device 14. Accordingly, receipt of a command other than the predetermined command by the device 14 will cause a command failure. An example of a predetermined command includes, but not limited to, REQUEST SENSE command according to USB Mass Storage Class Specification and SCSI command set. The REQUEST SENSE command is generally used to transfer sense data from the device 14 to the host 12 in order to determine whether or not an error has occurred. The first customized command also presets or defines the sense data as being a first state in which the device 14 appears disconnected from the host 12, e.g. "Medium Not Present."

The application 18 then solicits a command failure or failed response from the device 14 in block 204 by issuing to the device 14 a second command which is other than the predetermined command. Since the device 14 has been configured in block 202 to reject all commands except for the predetermined command, any other command will result in a command failure. An example of a suitable command is the TEST UNIT READY command, based on standard SCSI command set, which is to request the device 14 report if it is ready. The purpose of the second command in block 204 is to generate a command failure which in turn causes the host OS 16 initiate an error check in accordance with standard OS behavior. In response to the TEST UNIT READY command, the device 14 returns a command failure to the application 18 in a block 206.

Receipt of a command failure causes the host OS 16 to perform an error check by sending a REQUEST SENSE command to the device 14 in block 208. Since the REQUEST SENSE command was configured for acceptance by the device 14, the device 14 returns to the host OS 16 with sense data in accordance with standard response required of the REQUEST SENSE command. The sense data, which was earlier preset as being in the first state "Medium Not Present," is supplied to the host OS 16 in block 208. Accordingly, the host OS 16 now perceives or detects that no device is present even though the device 14 remains attached to the host 12.

Subsequently, the host OS 16 is manipulated to perceive that a device 14 has been re-connected in order to invoke enumeration. To this purpose, the application 18 issues a third customized command in block 212 to configure the device 14 reject all commands except for a predetermined command. The predetermined command in the current instance may also be the REQUEST SENSE command. The third customized command also overwrites existing sense data and presets it as being a second state in which the device 14 appears connected to the host 12, e.g. "Not Ready to Ready Transition—Medium Changed." Further, the device 14 may adjust a value of logic unit numbers (LUN) based on the current number of partitions in the device 14. The adjusted LUN value may be subsequently provided to the host OS 16 during enumeration.

The application 18 again solicits a command failure or failed response from the device 14 to cause the host OS 16 initiate an error check. To this purpose, a fourth command, which is a command other than the predetermined command, may be issued to the device 14 in block 214. This fourth command may be the same as the second command in block 204, e.g. TEST UNIT READY command, or may be any other suitable commands. In response to the fourth command, the device 14 returns a command failure to the application 18 in a block 216 since the device 14 has been earlier configured in block 212 to reject all commands except for the predetermined command, e.g. REQUEST SENSE command.

Receipt of the command failure triggers the host OS 16 to perform error checking by issuing a REQUEST SENSE command to the device 14 in a block 218. In response to the REQUEST SENSE command, the device 14 returns or supplies to the host OS 16, in a block 220, with sense data which has been preset as being the second state in which the device 14 appears connected to the host 12, e.g. "Not Ready to Ready Transition—Medium Changed". Accordingly, the host OS 16 now detects or perceives a change in an attached device 14 even though the same device 14 remains attached to the host 12 throughout the sequence 200.

Because the host OS 16 detects a device change, the host OS 16 initiates an enumeration process in block 222 in accordance with standard OS behavior. The enumeration process includes, inter alia, obtaining the number of partitions (i.e. LUN value) and size of each partition in the device 14, and supplying these values to the host OS 16 in a block 222.

In the foregoing paragraphs, the REQUEST SENSE command is used to provide a device condition or state even though the device condition is manipulated or preset to emulate detachment and attachment of a device to a host. It should be appreciated that other commands capable of indicating a device condition or capable of indicating a connection state, through a parameter or otherwise, of a device in relation to a host, may be used in embodiments of the invention with suitable modifications.

In one aspect, the REQUEST SENSE command may be described as a command configured to provoke a response from a target device receiving the command, in which the response includes information on the target device, for example, whether the target device is perceived as being connected to another device.

Embodiments of the invention are particularly advantageous because re-enumeration of a device 14 connected to a host 12 may be automatically initiated without manual intervention. Therefore, the re-enumeration process is transparent to a user and also appears seamless with an event, such as repartitioning of the device. Further, embodiments of the invention do not require additional hardware or circuitry in the devices which would otherwise incur additional manufacturing costs. Embodiments of the invention may be applied to a variety of storage devices utilizing a USB connection. Examples of such devices include, but not limited to, flash drives (commonly termed as pen drives, memory sticks or thumb drives), external hard drives and any other such drives with specific applications setup.

It is to be understood that other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

The invention claimed is:

1. A computer-implemented method comprising using a host controller that is coupled to a target device to sequentially solicit a command failure from the target device, initiate a first error check of the target device responsive to the command failure which reports a false status indication, initiate a second error check of the target device responsive to the command failure that reports a true status indication, and re-enumerate the target device responsive to the second error check.

2. The method of claim 1, wherein the error check of the using step provides the true status indication of the target device, and wherein the using step further comprises prior steps of soliciting a previous command failure, initiating a previous error check in response thereto, and obtaining a false status indication of the target device responsive to the previous error check.

3. The method of claim 1, wherein the using step further comprises configuring the target device to reject all commands except for a selected command from the host controller and solicits the command failure from the target device by issuing a command that is different from the selected command.

4. The method of claim 3, wherein the host controller further issues the selected command to the target device to carry out the error check.

5. The method of claim 1, wherein the target device remains continuously coupled to the host controller during the using step.

6. The method of claim 1, wherein the target device is characterized as a Universal Serial Bus (USB) device.

7. The method of claim 1, wherein the false status indication corresponds to the target device appearing to be disconnected from a host.

8. The method of claim 1, wherein the true status indication corresponds to the target device appearing to be connected to a host.

9. A computer readable storage medium with computer readable code stored therein comprising instructions directing a host controller to configure a device continuously coupled to the host controller to issue a command failure, report a false status indication responsive to a first error check and a true status indication responsive to a second error check, the instructions further directing the host controller to initiate re-enumeration of the device in response to the true status indication.

10. The medium of claim 9, wherein the false status indication corresponds to the device appearing to be disconnected from the host controller while the device remains connected to the host.

11. The medium of claim 10, wherein the true status indication corresponds to the device appearing to be connected to the host while the device remains connected to the host.

12. The medium of claim 9, wherein device is characterized as a Universal Serial Bus (USB) device.

13. The medium of claim 9, wherein multiple command failures are issued by the device before issuing the true status indication.

14. The medium of claim 9, wherein re-enumeration results in a partitioning of a memory space of the device.

15. The medium of claim 9, wherein re-enumeration results in a modification to a security setting of the device.

16. A computer-implemented method for initiating re-enumeration of a target device continuously coupled to a host controller comprising soliciting a command failure from the device to initiate an error check of the device, followed by soliciting a second command failure from the device to initiate a second error check of the device, followed by re-enumeration of the device by the host controller responsive to the second error check.

17. The method of claim 16, further comprising using the host controller to solicit the command failure by configuring the device to reject a selected command and then issuing the selected command to the device.

18. The method of claim 16, further comprising using the host controller to solicit the second command failure by configuring the device to reject a selected command and then issuing the selected command to the device.

19. The method of claim 16, further comprising using an operating system stored in a memory of the host device to perform the re-enumeration of the target device responsive to the true status indication.

20. The method of claim 16, in which said error checks are carried out by an application program resident in memory of a host device with which the host controller is associated, and the re-enumeration of the target device is carried out by an operating system resident in memory of the host device.

* * * * *